(12) United States Patent
Ryan

(10) Patent No.: US 8,864,397 B2
(45) Date of Patent: Oct. 21, 2014

(54) MULTIPURPOSE WRITING INSTRUMENT

(76) Inventor: Jason Ryan, Ottawa (CA)

(*) Notice: Subject to any disclaimer, the term of this patent is extended or adjusted under 35 U.S.C. 154(b) by 365 days.

(21) Appl. No.: 12/954,815

(22) Filed: Nov. 26, 2010

(65) Prior Publication Data

US 2012/0134736 A1    May 31, 2012

(51) Int. Cl.
*B43K 29/08*    (2006.01)
*G01C 9/28*    (2006.01)

(52) U.S. Cl.
CPC .. *B43K 29/08* (2013.01); *G01C 9/28* (2013.01)
USPC .............................................. 401/52; 401/195

(58) Field of Classification Search
CPC ................................. B43K 29/08; G01C 9/28
USPC ..................................... 401/52, 195
See application file for complete search history.

(56) References Cited

U.S. PATENT DOCUMENTS

| 667,968 | A | * | 2/1901 | Call ................................. 401/92 |
| D126,555 | S | * | 4/1941 | Gurtov ............................. D8/62 |
| 2,251,640 | A | * | 8/1941 | Skrainka .......................... 33/372 |
| 3,186,099 | A | * | 6/1965 | Florko, Jr. ........................ 33/347 |
| 5,522,146 | A | | 6/1996 | Warburton |
| 6,599,045 | B1 | * | 7/2003 | Kolb ............................... 401/52 |

FOREIGN PATENT DOCUMENTS

DE    20 2004 001 011 U1    3/2006

OTHER PUBLICATIONS

Certified English Translation of De 20 2004 001 011 U1.

* cited by examiner

*Primary Examiner* — David Walczak
*Assistant Examiner* — Joshua Wiljanen

(57) ABSTRACT

A disposable writing instrument is provided for carpenters, masons and other tradesmen. The instrument is a lead pencil which comprises one or more accessories, including a level and a ruler. The level is positioned about the center of the instrument. Either or both ends of the instrument are adapted to be used to mark a surface.

24 Claims, 6 Drawing Sheets

35
35

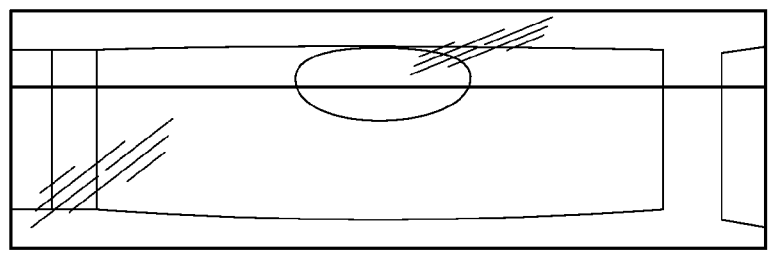
FIG. 15A
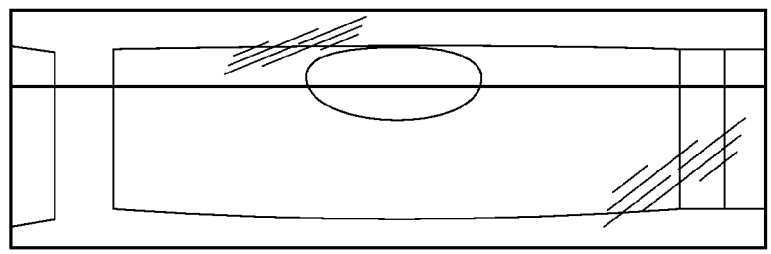
FIG. 15B
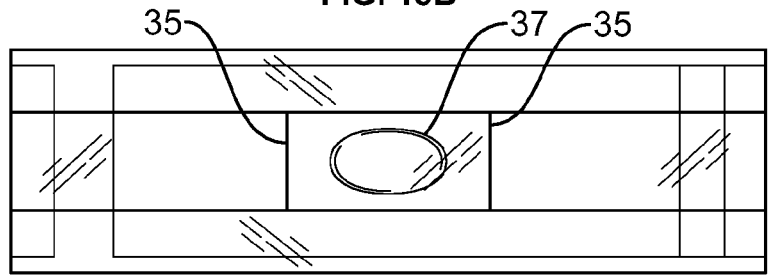
FIG. 16
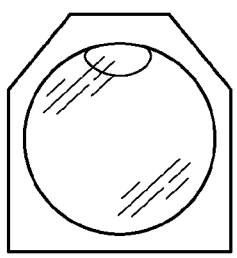 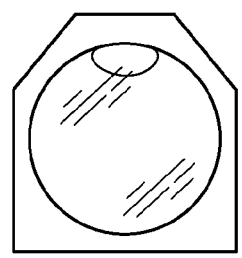
FIG. 17     FIG. 18
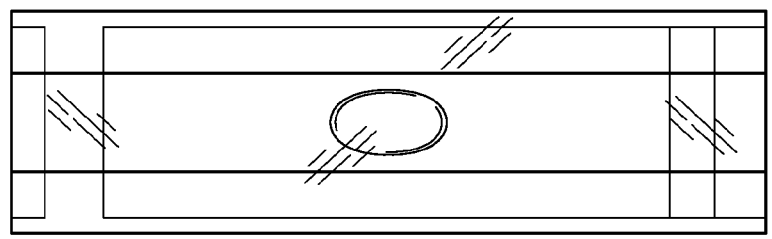
FIG. 19

MULTIPURPOSE WRITING INSTRUMENT

FIELD OF THE INVENTION

The invention herein pertains to a writing instrument for use by carpenters, masons and other tradesmen for marking surfaces, leveling and measuring short distances.

BACKGROUND OF THE INVENTION

Carpenters, masons, other tradesman and residential homeowners require quick access to a marking instrument and a level for brief periods several times during a job. The job can vary from carpentry to stone masonry to construction to general fixing or maintenance around the house. Often, a disposable carpenter's pencil is used to mark a surface and a bubble level to level the surface. As bubble levels are available in multiple sizes, for jobs in smaller spaces, smaller levels typically are used.

A carpenter's pencil is the standard writing instrument in the trade because it is sturdy, reliable, inexpensive, widely available and disposable. Typically, the user sharpens the pencil with a utility or other knife and writes with one or either end of the pencil until the overall length of the pencil is too short to hold without difficulty, at which time the remaining pencil bit is discarded and another pencil is used. Other pencils are comprised entirely or almost entirely of lead or a graphite composition and therefore do not require sharpening.

When not being used, the pencil is typically kept in the same place proximate the user so as to be located easily when needed, such as in the user's pocket, tool belt or even positioned behind the user's ear.

Writing instruments that have functions in addition to writing, such as rulers and bubble levels exist in the prior art, however they suffer from several deficiencies. A writing instrument is required in order to overcome the deficiencies of the prior art.

SUMMARY OF THE INVENTION

It is an object of the invention to provide a writing instrument for marking a surface. The instrument comprises an integral level, located at about the center, which has a full view for ease of reading, a standard carpenter's pencil shape and the capacity to write with one or either end of the instrument.

It is a further object of the invention to provide a writing instrument which has ruler graduations along its length.

It is a further object of the invention to provide a writing instrument which has a magnet for removably coupling the writing instrument to a metal surface.

It is a further object of the invention to provide a writing instrument which has a clip for removably clipping the writing instrument to a surface for temporary storage when not in use.

BRIEF DESCRIPTION OF THE DRAWINGS

FIG. 15A is a front view of a hexagonal-shaped bubble level, prior to integration in the embodiments of FIGS. 1 and 2;

FIG. 15B is a rear view of the bubble level of FIG. 15a;

FIG. 16 is a top view of the bubble level of FIG. 15A;

FIG. 17 is a right end view of the bubble level of FIG. 15A;

FIG. 18 is a left end view of the bubble level of FIG. 15A;

FIG. 19 is a bottom view of the bubble level of FIG. 15A; and

FIGS. 20A, B and C illustrate writing instruments having shafts made of a material other than lead and including a lead within the shaft. FIGS. 20D, E and F illustrate writing instruments wherein the lead is the entire or almost the entire shaft. FIG. 20A is a wide octagonal-shaped instrument comprising a rectangular lead. FIG. 20B is an octagonal-shaped instrument comprising a circular lead and FIG. 20C is an oval-shaped instrument comprising a rectangular lead. FIG. 20D is a wide octagonal-shaped instrument composed entirely or almost entirely of lead. FIG. 20E is an octagonal shaped instrument composed entirely or almost entirely of lead. FIG. 20F is an oval-shaped instrument composed entirely or almost entirely of lead.

DETAILED DESCRIPTION

Throughout the specification, the following definitions are used, unless specifically noted otherwise:

Marking includes writing, and making marks or other indicia to identify measurements, letters, numbers, text, other symbols and notations.

Writing instrument means any instrument for manual marking on a surface and includes a carpenter's pencil.

Carpenter's pencil includes those writing instruments typically used by users when doing carpentry, stone masonry, construction, general fixing or maintenance.

User includes carpenters, masons, other tradesman, residential homeowners and others who use writing instruments.

Surface includes any surface irrespective of the surface size, roughness or orientation, which is capable or being marked with a writing instrument.

Storage location means any place where a writing instrument is located when not in operational use, including but not limited to a pocket, tool box or tool belt, proximate a head covering, behind a user's ear, in a user's hand and adjacent a metal surface.

Functional accessory includes a level, magnet, clip and any other accessory which has a function that is useful for a user, other than marking. Levels include bubble levels and digital levels.

Lead includes one or more graphite compositions. The lead is the marking element in a writing instrument.

Figure 1:
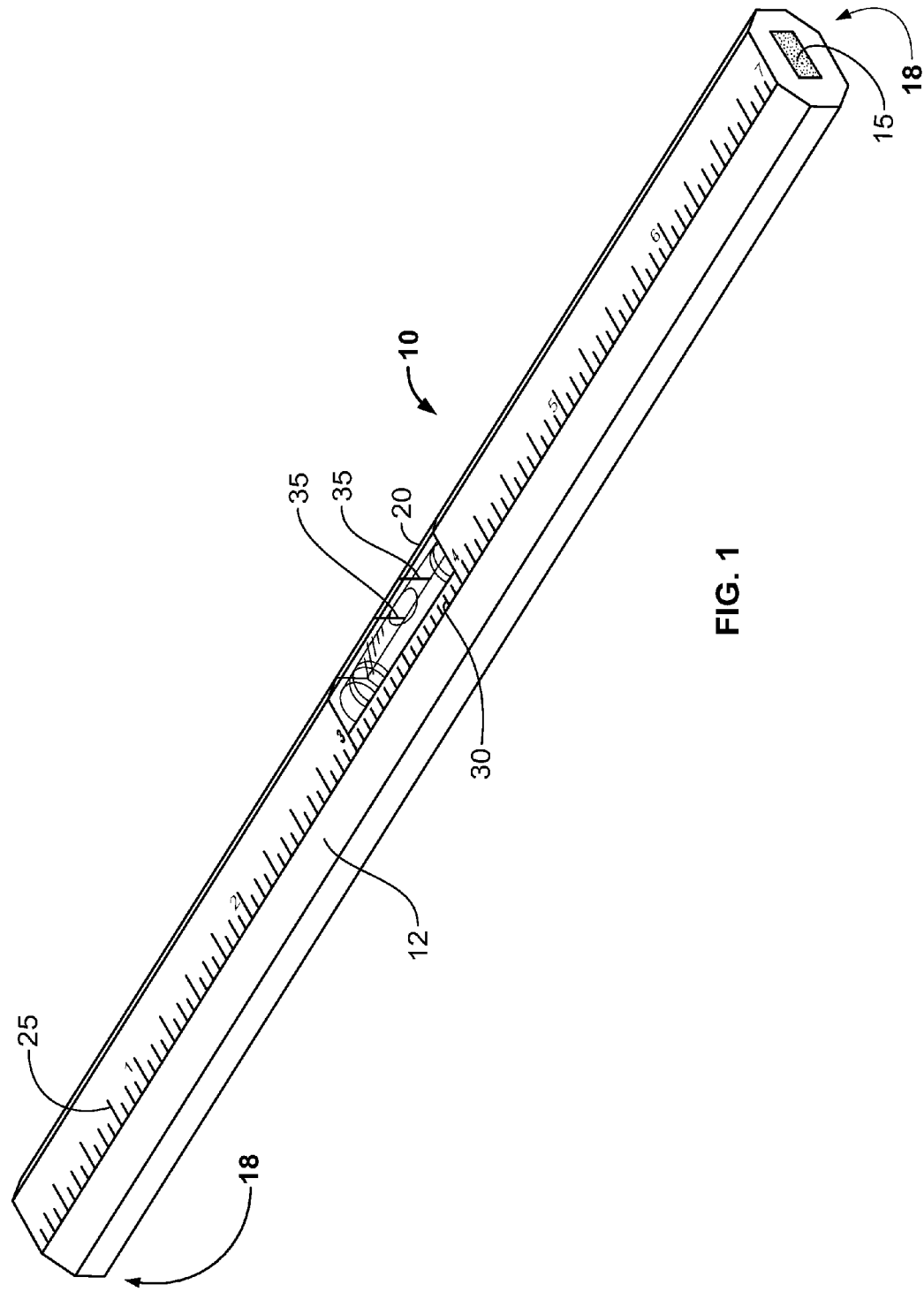
FIG. 1 is a perspective view of one embodiment of the present invention illustrating a wide octagonal-shaped writing instrument comprising a complementary bubble level and ruler graduations.
Figure 2:
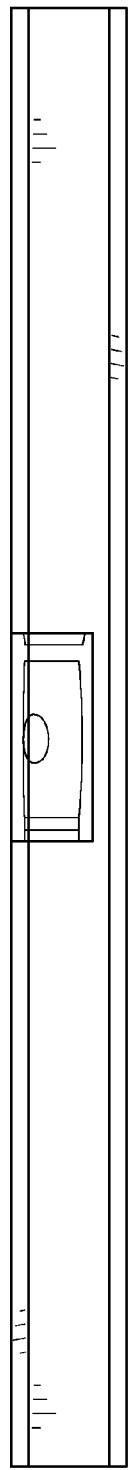
FIG. 2 is a front view of another embodiment of the present invention illustrating a wide octagonal-shaped writing instrument comprising a complementary bubble level.
Figure 3:
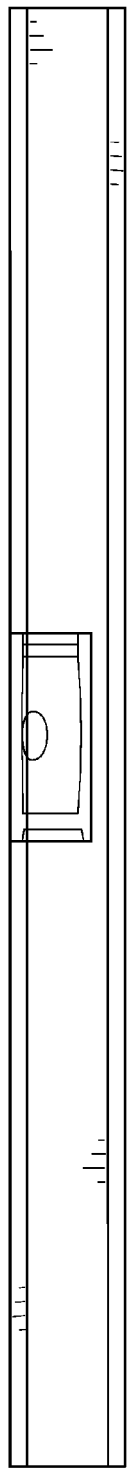
FIG. 3 is a rear view of the embodiment of FIG. 2.
Figure 4:
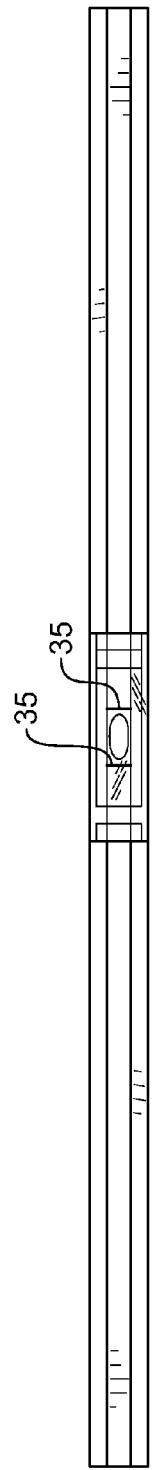
FIG. 4 is a top view of the embodiments of FIGS. 1 and 2.
Figure 5:
FIG. 5 is a bottom view of the embodiments of FIGS. 1 and 2.
Figure 6:
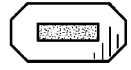
FIG. 6 is a right end view of the embodiments of FIGS. 1 and 2.
Figure 7:
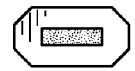
FIG. 7 is a left end view of the embodiments of FIGS. 1 and 2.
Figure 8:
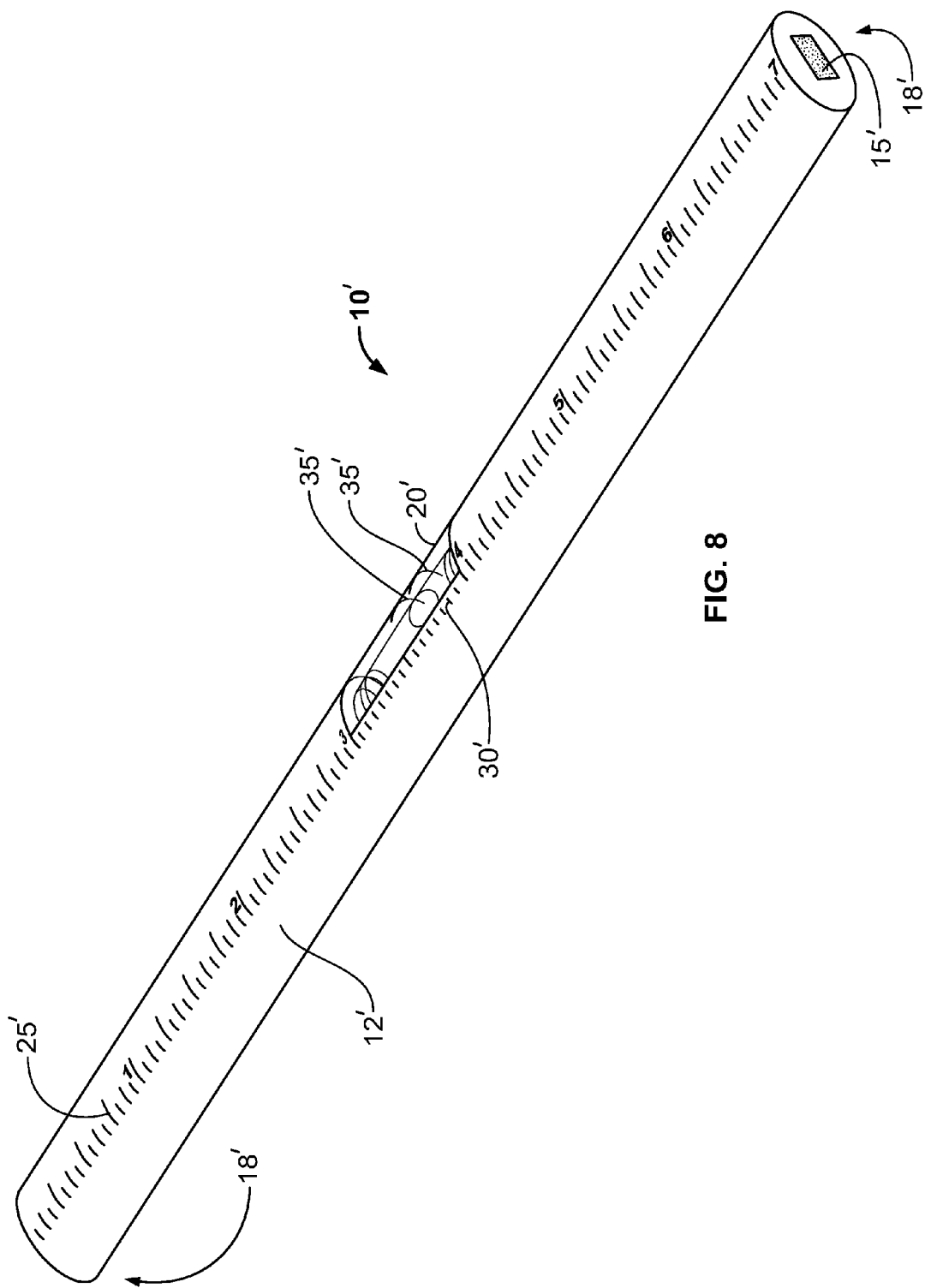
FIG. 8 is a perspective view of another embodiment of the present invention illustrating an elliptic cylinder or oval-shaped writing instrument comprising a complementary bubble level and ruler.
Figure 9:
FIG. 9 is a front view of another embodiment of the present invention showing an elliptic cylinder or oval-shaped writing instrument comprising a complementary bubble level.
Figure 10:
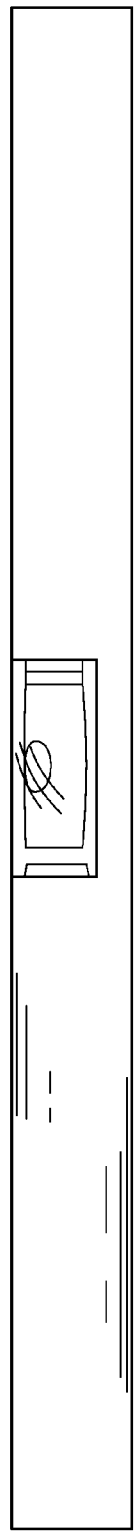
FIG. 10 is a rear view of the embodiment of FIG. 9.
Figure 11:
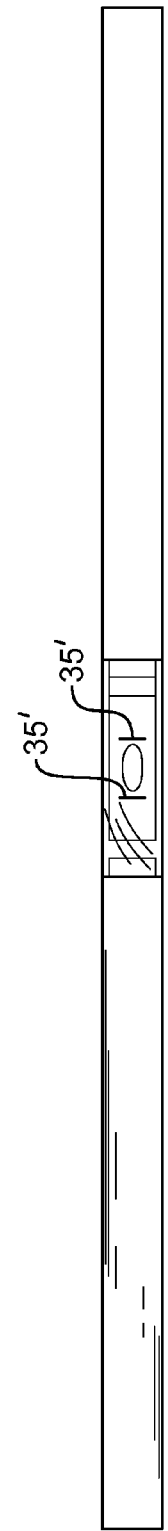
FIG. 11 is a top view of the embodiment of FIGS. 8 and 9.
Figure 12:
FIG. 12 is a bottom view of the embodiment of FIGS. 8 and 9.
Figure 13:
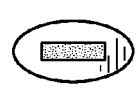
FIG. 13 is a right end view of the embodiment of FIGS. 8 and 9.
Figure 14:
FIG. 14 is a left end view of the embodiment of FIGS. 8 and 9.

FIG. 1 is a perspective view of one embodiment of the present invention. A writing instrument 10 comprises a longitudinal shaft 12, ranging from seven to ten inches in length. The illustrated embodiment is about seven inches in length. The instrument can be various shapes, including round, oval, hexagonal and octagonal. The illustrated embodiment is wide octagonal comprising two parallel faces which are wider than the six other faces. Within the shaft 12 is a lead. The lead can be of any shape including rectangular as illustrated, and circular. The lead generally runs the length of the shaft.

The shaft 12 has a width ranging from about 6.5 to 8.0 mm. In one embodiment, the shaft has a width of 7.5 mm. In another embodiment, the shaft as a width of 7.0 mm.

In about the center of the shaft 12 is a recess or space, ranging from about 20 to 25 mm in length and over half the depth of the shaft 12. In one embodiment the space is about 22 mm along the length of the shaft 12. The space can be cut out from the shaft using conventional tools or preformed in the shaft. The depth of the space can range from about 6 to 10 mm. In one embodiment, the space is about 8 mm deep.

A functional accessory is inserted into and secured within the space. The functional accessory can be secured in a removable or permanent manner, depending on the accessory. A removably securable accessory may be press fit and locked into the space, then removed and replaced with another removably securable accessory. For instance a magnet is removably secured within the space of the instrument. The instrument is capable of being removably attached to a metal surface when not in use. The magnet can be removed and replaced with another functional accessory such as a level or a clip.

Another functional accessory illustrated in FIG. 1 is a ruler having graduations 25 along the length of the shaft 12. The illustrated embodiment shows a 7-inch scale. Other scales and other lengths are contemplated, including millimeters and a masonry measurement scale. At about the center, proximate the space, the graduations 30 are adapted accordingly so as to maintain their functionality (ie: readability for a ruler) given the space restrictions.

A permanently affixed accessory may be glued to one or more faces in the space. In one embodiment, clear glue is used. In the illustrated embodiment, a bubble level 20 is affixed within the space. The shape of the bubble level 20 complements the shape of the instrument 10 in that the outside walls of the bubble level are flush or almost flush with the instrument. In other embodiments, not illustrated, the level is a digital level.

The embodiments of FIGS. 1-7 correspond to an octagonal-shaped instrument wherein two parallel faces are wider than six other faces, referred to as a wide octagonal instrument. FIG. 1 comprises one or more rulers on one or more faces. Front, rear, top, bottom and end views of one embodiment which does not comprise a ruler are shown in FIGS. 2-7 respectively.

The embodiments of FIGS. 8-14 correspond to an elliptic cylinder or oval-shaped instrument. The embodiment of FIG. 8 comprises one or more rulers whereas the embodiments of FIGS. 9-14 do not comprise a ruler.

Both distal and proximal ends 18, 18' are capable of being sharpened and shaved by the user so as to access the lead 15, 15' for marking a surface.

One example of a bubble level 20 which is complementary to the writing instrument embodiment of FIGS. 1-7 is illustrated in FIGS. 15A (front view), 15B (rear view), 16 (top view), 17 and 18 (end views) and 19 (bottom view). In this embodiment the bubble level 20 has a hexagonal shape as depicted in FIGS. 17-18. In one embodiment, the bubble level 20 is composed of generally clear or translucent plastic comprising a clear or relatively clear liquid and bubble 37. Level lines 35 are positioned evenly so as that the bubble 37 is centered when bubble level 20 is level.

In embodiments where the writing instrument 10' has an oval shape, the bubble level has a semi-oval shape.

When the bubble level 20 is secured in the writing instrument 10, a user has at least a 180 degree unobstructed view of the bubble from the top and sides.

In one embodiment, the space in the shaft 12 is cut so that a part of the lead is cut. A writing instrument 10 having a partly cut lead and space, into which a bubble level 20 or other functional accessory is secured provides strength to the writing instrument 10 with a reduction in breaks during the manufacturing process.

Figure 20A:
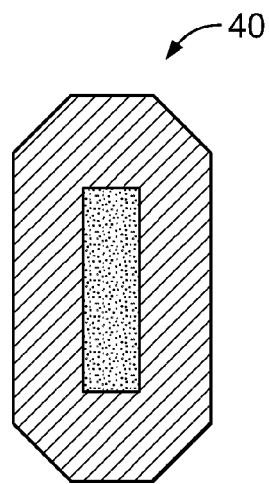
FIGS. 20A-F comprises end views of various shapes of writing instruments.
Figure 20B:
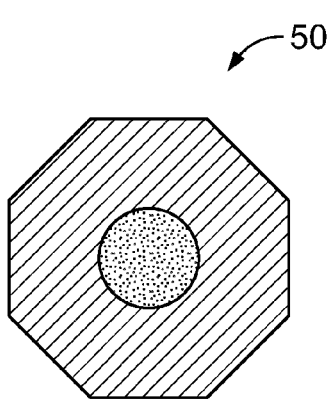
Figure 20C:
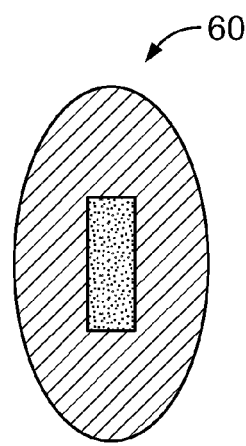

Various shapes of writing instruments, wherein the shaft is made of wood, are contemplated including wide octagonal 40, octagonal 50 and oval 60 as illustrated in FIGS. 20A, 20B and 20C. Various shapes of leads are also contemplated including rectangular and circular as illustrated.

Figure 20D:
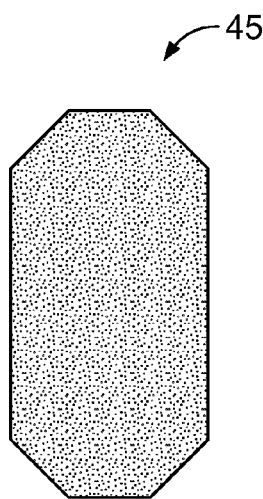
Figure 20E:
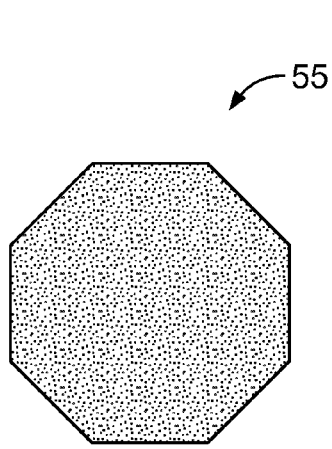
Figure 20F:
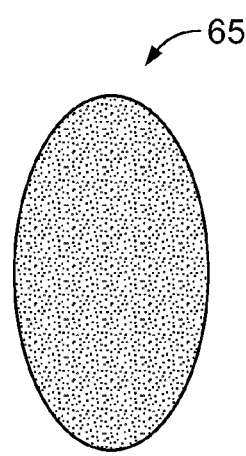

In other embodiments, the shaft is composed entirely or almost entirely of lead, and can have various shapes including wide octagonal 45, octagonal 55 and oval 65 as illustrated in FIGS. 20D, 20E and 20F.

When the functional accessory is a level such as a bubble level 20, it can be shaped so that its external faces complement the faces of the shaft, so as to be flush or almost flush with the shaft.

In one embodiment a magnet is located at the bottom of the space, between the bubble level 20 and the shaft. When not in use, the writing instrument is capable of being temporarily secured to a metal surface storage location.

In other embodiments, the functional accessory is a clip, such as a plastic clip, which allows the writing instrument to be temporarily secured to a variety of surfaces in a storage location. In other embodiments, the functional accessory is a magnet which allows the writing instrument to be temporarily secured to a metal surface storage location.

In operation, a user often needs to mark and level a surface, such as bricks. The user retrieves the writing instrument of the present invention from a storage location and marks the surface and/or takes a measurement and/or measures whether the grade is level as needed with the writing instrument in one quick action, prior to storing the writing instrument in the same or a different storage location. Two or more actions are performed with the writing instrument by the user in successive movements. The speed of movements which is achieved by a user with the writing instrument of the present invention is very quick and results in quicker tasks being accomplished and obviates the requirement of switching between multiple tools. All movements, including measuring a distance, marking, levelling, clipping or storing with a magnet are capable of being performed with one hand.

Although the description above contains many specific details, these should not be construed as limiting the scope of the embodiments but as merely providing illustrations of some of the presently preferred embodiments. Thus the scope of the embodiments should be determined by the appended claims and their legal equivalents, rather than by the examples given.

The invention claimed is:

1. A one-piece writing instrument for marking a surface, comprising:
   a. a generally longitudinal unitary shaft having two ends and a center, each of said ends adapted to mark said surface, said shaft reducing in length after marking;
   b. a space cut out of a portion of said shaft generally in the center, said space adapted to accept a complementary functional accessory therein; and
   c. a complementary functional accessory engagingly secured within said space, said shaft and said complementary functional accessory having a uniform cross-section along their entire length;
   wherein said functional accessory is one or more of a level and a magnet.

2. The writing instrument of claim 1 wherein each of said two ends is capable of being sharpened in order to mark said surface.

3. The writing instrument of claim 1 wherein said shaft has a length ranging from 7 to 10 inches.

4. The writing instrument of claim 1 wherein said shaft has a width ranging from about 6.5 to 8.0 mm.

5. The writing instrument of claim 4 wherein said shaft has a width of about 7.5 mm.

6. The writing instrument of claim 1 wherein said space is about 20 to 25 mm along the length of said shaft.

7. The writing instrument of claim 6 wherein said space is about 22 mm along the length of said shaft.

8. The writing instrument of claim 1 wherein said space ranges from about 6 to 10 mm deep.

9. The writing instrument of claim 8 wherein said space is about 8 mm deep.

10. The writing instrument of claim 1 wherein said shaft has a cross-section which is generally octagonal.

11. The writing instrument of claim 1 wherein said shaft has a cross-section which is generally oval.

12. The writing instrument of claim 1 wherein said functional accessory is a level.

13. The writing instrument of claim 12 wherein said level is chosen from the group consisting of a digital level and a bubble level comprising a bubble in liquid.

14. The writing instrument of claim 13 wherein said bubble level comprises generally clear or translucent plastic and wherein said bubble and said liquid are clearly visible at least 180 degrees around said bubble level.

15. The writing instrument of claim 12 wherein said level comprises a window which is unobstructed from top and side views of said writing instrument.

16. The writing instrument of claim 12 wherein said level has a cross-section which is generally hexagonal.

17. The writing instrument of claim 12 wherein said level has a cross-section which is generally semi-oval.

18. The writing instrument of claim 1 wherein said functional accessory is secured in said space and is flush or almost flush with said shaft.

19. The writing instrument of claim 1 further comprising one or more rulers along the length of said shaft; wherein said one or more rulers is graduated in one or more of inches, millimeters or a masonry measurement scale.

20. The writing instrument of claim 1 wherein said functional accessory is a magnet.

21. The writing instrument of claim 1 wherein said functional accessory is a level and a magnet, said magnet engagingly secured within said space under said level.

22. The writing instrument of claim 1 further comprising a generally uniform lead along the length of the shaft generally within the center of the shaft, wherein said space includes a portion cut out of said lead.

23. The writing instrument of claim 1 comprising an integral lead located longitudinally within the center of the shaft.

24. The writing instrument of claim 1 wherein said shaft is composed entirely or almost entirely of lead, wherein said lead is comprises one or more graphite compositions.

* * * * *